(12) United States Patent
Aoki et al.

(10) Patent No.: US 6,595,473 B2
(45) Date of Patent: Jul. 22, 2003

(54) FIXING STRUCTURE AND FIXING TOOL FOR CORRUGATED TUBE AND TOOL

(75) Inventors: Tohru Aoki, Shizuoka (JP); Kenichi Doshita, Shizuoka (JP); Mitsunori Tsunoda, Shizuoka (JP); Hiroshi Watanabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/891,386

(22) Filed: Jun. 27, 2001

(65) Prior Publication Data

US 2002/0000499 A1 Jan. 3, 2002

(30) Foreign Application Priority Data

Jun. 30, 2000 (JP) .................................... 2000-198690
Oct. 18, 2000 (JP) .................................... 2000-317983
May 21, 2001 (JP) .................................... 2001-150744

(51) Int. Cl.$^7$ .............................. F16L 3/08; F16L 55/00
(52) U.S. Cl. ........................ 248/74.4; 248/73; 285/419; 138/108
(58) Field of Search ............................ 248/74.4, 49, 65, 248/70, 71, 73, 74.1; 138/108, 113; 285/419, 373

(56) References Cited

U.S. PATENT DOCUMENTS

| 3,006,663 | A | * | 10/1961 | Bowne ........................ 285/233 |
| 3,711,633 | A | * | 1/1973 | Ghirardi et al. ............. 174/135 |
| 4,248,459 | A | * | 2/1981 | Pate et al. .................. 285/319 |
| 4,417,755 | A | * | 11/1983 | Gittleman ................... 285/373 |
| 4,443,031 | A | * | 4/1984 | Borsh et al. ................ 285/419 |
| 4,470,622 | A | * | 9/1984 | Pate et al. .................. 285/419 |
| 4,564,163 | A | * | 1/1986 | Barnett ........................ 248/71 |
| 4,779,828 | A | * | 10/1988 | Munch ....................... 248/74.3 |
| 5,390,876 | A | * | 2/1995 | Hatano et al. ............... 248/73 |
| 6,085,795 | A | * | 7/2000 | Ogawa et al. ............. 138/108 |
| 6,105,216 | A | * | 8/2000 | Opperthauser ............... 24/459 |
| 6,367,849 | B1 | * | 4/2002 | Tatsuta et al. ............. 285/373 |
| 6,398,170 | B1 | * | 6/2002 | Wada ........................ 248/74.5 |

* cited by examiner

*Primary Examiner*—Anita King
(74) *Attorney, Agent, or Firm*—Armstrong, Westerman & Hattori, LLP

(57) ABSTRACT

Slidable-contact portions 10, 24 of a fixing tool 1 are engaged with the concave grooves 11 of a corrugated tube 2 which is circular in section so that the corrugated tube is supported rotatably in its circumferential direction by the fixing tool 1. Where the corrugate tube is oval in section, it is fixed inside a rotating member 33 with a circular outer periphery, and the rotating member is held rotatably in its circumferential direction inside a body of the fixing tool 1. The rotating member may be moved along a cam groove, or may hold the corrugated tube in a state decentered in an oblique direction. The fixing tool 1 is composed of a receiving part 3 and covering part 2 which have slidable-contact supporting portions 10, 24 to be engaged with the concave grooves 11 of the corrugated tube 2. The receiving part 3 and the covering part 4 may be provided with curved walls which serve to rectify the corrugated tube in its curved state, thereby preventing the corrugated tube and internal electric wires from being buckled. In this configuration, when a wire harness with a corrugated tube is flexed along a vehicle body, its twisting, buckling or damaging can be prevented.

15 Claims, 8 Drawing Sheets

FIXING STRUCTURE AND FIXING TOOL FOR CORRUGATED TUBE AND TOOL

BACKGROUND OF THE INVENTION

1. Field of the Invention

This invention relates to a fixing structure and a fixing tool for a corrugated tube which can prevent twisting or bending thereof when a wire harness using a flexible corrugated tube for wire protection is arranged in an bended manner along the side of an attaching side of a vehicle body.

2. Description of the Related Art

FIG. 12 shows a conventional fixing structure for a corrugated tube.

A corrugated tube 71 is made of synthetic resin and is formed in a shape of a thin cylinder. The corrugated tube 71 has circumferential concave grooves and convex strips arranged in parallel at regular pitches in a longitudinal direction. The corrugated tube is flexible. The corrugated tube with plural electric wires passed internally serves as a wire harness.

The corrugated tube 71 serves as a tube for protecting electric wires. The corrugated tube 71 is apt to flex together with the plural electric wires 72 according to a two-dimensional or three-dimensional curved panel 75 on the mounting side 74 of a vehicle body. This enhances workability of arranging the wire harness.

Some corrugated tubes may have a longitudinal slit, and some corrugated tubes may not have the longitudinal slit. In the corrugated tube 71 with the slit, the electric wires can be easily ushered into the corrugated tube 71. In the corrugated tube 71 with no slit, it is troublesome to pass the electric wires through the corrugated tube. However, the slit will not open and winding of a vinyl tape is not required.

A corrugated tube fixing tool (hereinafter simply referred to as a fixing tool) 76 is constituted as a clamp for clamping the corrugated tube 71 against a panel 75 on the mounting side. The fixing tool 76 is necessarily arranged at the bending portion on the mounting side of the vehicle body. The fixing tool may be a binding tool such as a band.

The fixing tool 76 is secured to the panel 75 on the mounting side 74 using a flexible clip or screw. The clamping clip has a pair of flexible clamping pieces and fixed in a hole of the panel 75. In the case of using the screw (not shown), the screw is inserted into the hole of a bracket of the fixing tool 76 and further passed into a screw hole of the panel 75.

The wire harness 73 is arranged on the curve of the mounting side of the vehicle body. The outer corrugated tube 71 is firmly secured to the mounting side 74 by a plurality of fixing tools 76 in the longitudinal direction so that the wire harness 73 is firmly secured to the mounting side 74. This prevents swing of the wire harness due to vibration while a vehicle is running and interference between the vehicle body (represented by (74)) and wire harness 73 and attendant alien sound.

The electric wires 72 within the corrugated tube 71 are protected from rainwater or dust by the corrugated tube 71. The electric wires 72 are extended along the vehicle body (74) to predetermined positions of an instrument panel, floor, door (hinge door or slide door) so that they are connected to the corresponding electric devices and auxiliary devices through a connector.

However, in the conventional fixing structure and fixing tool 76 for the corrugated tube, when the corrugated tube 71 is firmly secured by the fixing tool 76 in order to secure the wire harness 73 at the flexing position of the three-dimensional mounting side 74 of the vehicle body, the electric wires 72 and the corrugated tube 71 will be twisted while they are flexing. In this case, the corrugated tube itself suffers the twisting stress. This presents a problem of deformation or damaging of the corrugated tube 71 or opening of the slit. When the slit opens, the internal electric wires 72 may bust out and may be stepped on by a human's foot, or otherwise water or dust may invade the opening portion.

Since the corrugated tube 71 suffers tension, the fixing tool 76 is apt to be pulled and come off. This leads to poor workability of its assembling into the vehicle body. Further, the fixing tool 76 may come off so that the wire harness dangles and generates interference with the vehicle body.

Further, where the wire harness 73 is greatly flexed for arrangement or largely swung at a fulcrum of the fixing tool 76, the end of the fixing tool 76, i.e. the opening portion from which the corrugated tube 71 is derived, the wire harness inclusive of the corrugated tube 71 is apt to flex. In this case, the corrugated tube 71 and the internal electric wires 72 are apt to be damaged.

SUMMARY OF THE INVENTION

In view of the above circumstances, an object of this invention is to provide a fixing structure and fixing tool of a corrugated tube that can prevent the twisting of the corrugated tube when the wire harness using the corrugated tube is securely arranged, thereby improving assembling workability, prevent the deformation or damaging of the corrugated tube or opening of the slit and opening of the slit which are attributable to the twisting, thereby assuring the function of the corrugated tube as a harness protecting tube, and prevent the coming-off of the fixing tool due to the tension of the corrugated tube.

Another object of this invention is to provide a fixing tool of a corrugated tube that can prevent a wire harness, i.e. corrugated tube and internal electric wires from being damaged where the wire harness is greatly flexed for arrangement, or greatly swung.

In order to attain the above objects, there is provided a fixing structure for a corrugated tube which is fixed on a mounting side of a vehicle body by a fixing tool, the corrugated tube being circular in section and having circumferential concave grooves and convex strips arranged alternately in its longitudinal direction of a wire harness, the corrugated tube and a plurality of electric wires passing through the corrugated tube constituting the wire harness, wherein the fixing tool includes slidable-contact supporting portions which are slidably engaged with the concave grooves of the corrugated tube so that the corrugated tube is supported rotatably in a circumferential direction by the slidable supporting portions.

There is also provided a fixing tool for a corrugated tube to a mounting side of a vehicle body, the corrugated tube being circular in section and having circumferential concave grooves and convex strips arranged alternately in its longitudinal direction, wherein the fixing tool includes a receiving part and a covering part for holding rotatably the corrugated tube in its circumferential direction, and the receiving part and the covering part have slidable-contact supporting portions to be slidably engaged with the concave grooves.

In such configurations of the fixing structure and fixing tool, where the wire harness with the corrugated tube which is circular in section is arranged on the two-dimensional or three-dimensional curved panel, even when twisting force is acted on the corrugated tube, the corrugated tube rotates circumferentially along the slidable-contact supporting portions of the fixing tool to absorb the twisting force. For this reason, undue twisting force is not acted on the corrugated tube. Thus, the deformation or damaging of the corrugated tube or opening of the slit for ushering the wire harness can be surely prevented. The pulling force due to the twisting of the corrugated tube is relaxed so that coming-off of the fixing tool from the panel can be prevented.

There is also provided a fixing structure for a corrugated tube which is fixed on a mounting side of a vehicle body by a fixing tool, the corrugated tube being circular in section and having circumferential concave grooves and convex strips arranged alternately in its longitudinal direction, the corrugated tube and a plurality of electric wires passing through the corrugated tube constituting a wire harness, wherein the fixing tool includes a rotating member having a circular outer periphery for the corrugated tube in its inside, and rotating member is held rotatably in a circumferential direction within a body of the fixing tool.

Preferably, the fixing tool further comprises a rotating member for fixing in its inside the corrugated tube which is oval in section, and the rotating member is held rotatably in a circumferential direction by the receiving part and the covering part.

Preferably, in the fixing tool for a corrugated tube to a mounting side of a vehicle body, the corrugated tube being circular or oval in section and having circumferential concave grooves and convex strips arranged alternately in its longitudinal direction, wherein the fixing tool includes a rotating member for fixing the corrugate tube in its inside and a receiving part and a covering part for rotatably holding the rotating member in a circumferential direction.

In these configurations, the wire harness with a "flat" corrugated tube which is oval in section is arranged on the two-dimensional or three-dimensional curved panel, even when twisting force is acted on the flat corrugated tube, the flat corrugated tube circumferentially rotates integrally with the body of the fixing tool. For this reason, undue twisting force or bending force is not acted on the flat corrugated tube. Thus, the deformation or damaging of the flat corrugated tube or opening of the slit for ushering the wire harness can be surely prevented. The pulling force due to the twisting of the corrugated tube is relaxed so that coming-off of the fixing tool from the panel can be prevented. Incidentally, since the corrugated tube may be either circular or oval in section, versatility of the fixing tool can be improved.

Preferably, a cam groove is formed in one of the body of the fixing tool and the rotating member and a projection which moves along the cam groove is attached to the other thereof so that the rotating member can move in the longitudinal direction of the wire harness while it rotates. Otherwise, the cam groove is formed in one of the rotating member, the receiving part and the covering part, and a follower projection which moves along the cam is formed in the other thereof.

In such a configuration, where the wire harness is extended from the vehicle body to the slide door, when the wire harness is twisted and pulled in the direction of opening/closing the slide door (particularly, when the slide door has been fully closed, the wire harness is pulled strongly), the rotating member can move in the longitudinal direction of the wire harness while it rotates. In this way, the wire harness is extended between the vehicle body and the slide door so that the pulling force is absorbed. In addition, since the wire harness is flexed with a great flexing radius, secular damaging of the wire harness, i.e. corrugated tube and internal electric wires can be prevented.

Preferably, the rotating member has an inside portion for immobily holding the corrugated tube, and the inside portion is decentered in an oblique direction so that the wire harness is flexible with a large flexing diameter in the oblique direction. Otherwise, the rotating member and inside portions of the receiving part and the covering part are tapered, and the inside of the rotating member is decentered in an oblique direction.

In such a configuration, when the wire harness is twisted and pulled in the direction of opening/closing the slide door, the rotating member rotates in the direction of pulling the wire harness, and the wire harness is flexed so as to be decentered in an oblique direction within the rotating member. In this case, as compared with the case the wire harness is not decentered, the flexing radius of the wire harness is increased. This prevents undue bending force from being acted on the wire harness, thereby preventing secular damaging of the wire harness, i.e. corrugated tube and internal electric wires. Incidentally, a combination of the extension and decentering of the wire harness prevents damaging of the wire harness more surely.

Preferably, the body of the fixing tool is provided with curved walls for the wire harness on a decentered side of the inside portion. In this configuration, since the wire harness derived from the rotating member in a curved shape is supported along the curved wall (e.g. at the tip of the curved wall), the flexing radius of the wire harness is defined largely, thus preventing the wire harness from being buckled, and hence preventing the corrugated tube and wires from being damaged more surely.

Preferably, the corrugated tube is oval in section. In this configuration, the fixing structure can be down-sized (low-profiled) by use of the flat corrugated tube. In addition, if the corrugated tube is caused to flex in a small-diameter direction when the slide door is opened/closed, the flexibility of the wire harness is increased, thereby preventing the corrugated tube from being damaged.

Preferably, the receiving part and the covering part have opposite semi-circular or arc concave portions, and the slidable-contact portions are formed at edges of each concave portions. In this configuration, the lower part of the corrugated tube is engaged with the concave portion of the receiving part whereas the upper part thereof is engaged with the concave portion of the covering part. Thus, the corrugated tube can be supported easily and surely by both concave portions, thereby improving the workability of assembling. Where the concave portions are formed on the walls on both sides of the receiving part and covering part, the corrugated tube can be held stably at two points in the longitudinal direction.

Preferably, the rotating member is divided into divisional members each having an inside portion which is circular or oval in section corresponding to a shape of the corrugated tube, and the inside portion has a convex strip to be engaged with one of the concave grooves of the corrugated tube.

In this configuration, since the flat corrugated tube which is oval in section is sandwiched by the divisional rotating members, it can be easily held, thereby improving the workability of assembling. Further, since the rotating member can be made divisional, the structure of the rotating member serving to fix the flat corrugated tube can be simplified and that of the mold for resin molding can be also simplified, thereby reducing the production cost.

Preferably, the rotating member has a convex strip and/or circumferential groove on its outer periphery and the receiving part and the covering part have a slidable-contact groove and/or slidable-contact convex strip which are to be slidably engaged with the convex strip and the circumferential groove.

In this configuration, since the convex strip and/or circumferential groove on its outer periphery of the rotating member and the receiving part are guided by the slidable-contact groove and/or slidable-contact convex strip of the receiving part and the covering par, the rotating member can be rotated smoothly and surely. Thus, the twisitng when the corrugated tube is arranged can be absorbed more surely.

Preferably, the cam groove has a starting point and an ending point with which the follower projection can be brought into contact.

In this configuration, when the rotating member is rotated by twisting of the wire harness, the ending point and starting point of the cam groove serve as stoppers for the projection. Namely, when the projection is brought into contact with the starting point or ending point of the cam groove, the further rotation of the rotating member, i.e. the twisting of the wire harness can be stopped, thereby preventing the electric wire or corrugated tube from being damaged due to undue twisting.

Preferably, the receiving part or covering part is provided with outward curved walls with which an outer surface of the corrugated tube is to be brought into contact so that the corrugated tube is prevented from becoming buckled. Further, the curved walls may be provided oppositely in a horizontal or vertical direction on the side of deriving the corrugated tube.

In this configuration, when the wire harness is flexed greatly so as to be arranged on the vehicle body, the outer surface of the corrugated tube is brought into contact with the curved wall of the fixing tool so that the wire harness is smoothly curved and rectified along the curved shape of the curved wall, thereby preventing the corrugated tube or internal electric wires from being damaged or deformed. This effect can be obtained also when the wire harness extended from the vehicle body to the slide door is swung largely as the slide door is opened/closed.

Preferably, the receiving part and covering part and the divisional members are rotatably coupled with each other using a hinge.

In this configuration, the operation of closing the covering part on the receiving part can be easily carried out, and the engagement of the slidable-contact supporting portion with the concave groove of the corrugated tube and that of the slidable-contact groove of the covering part with the groove of the rotating member can be improved. This improves and assures the operation of assembling.

The receiving part and the covering part are fixed by locking means. In this configuration, the operation of fixing the receiving part and the covering part can be carried out with one-touch of finger, thereby improving the workability of assembling.

Preferably, the receiving part is provided with a clamping clip to be securely inserted into a hole on a mounting side of a vehicle body.

In this configuration, the fixing tool can be easily secured to the vehicle body with the aid of the clamping clip. Further, since the clamping clip is rotatable within the hole of the vehicle body, the fixing tool is rotatable in the direction of flexing the corrugated tube. Thus, the tens ion of the corrugated tube can be absorbed or relaxed, thereby preventing the corrugated tube from being damaged or deformed due to flexing and the fixing tool from being come off.

The above objects and features of this invention will be more apparent from the following description taken in conjunction with the accompanying drawings.

DESCRIPTION OF THE PREFERRED EMBODIMENTS

Figure 1:
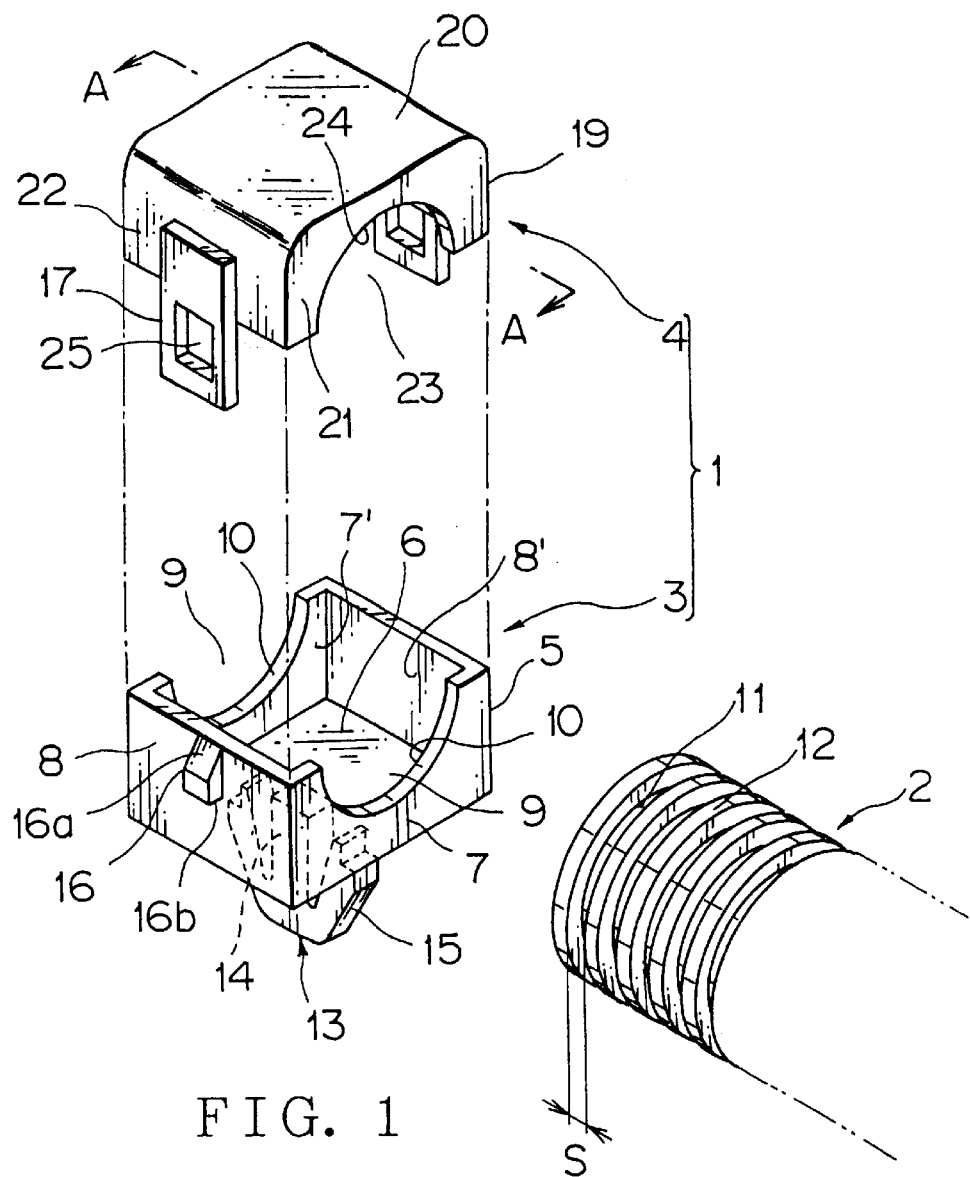
FIG. 1 is an exploded perspective view of a first embodiment of a fixing structure and fixing tool for a corrugated tube according to this invention.

Now referring to the drawings, an explanation will be given of various embodiments of this invention.

Embodiment 1

Figure 2:
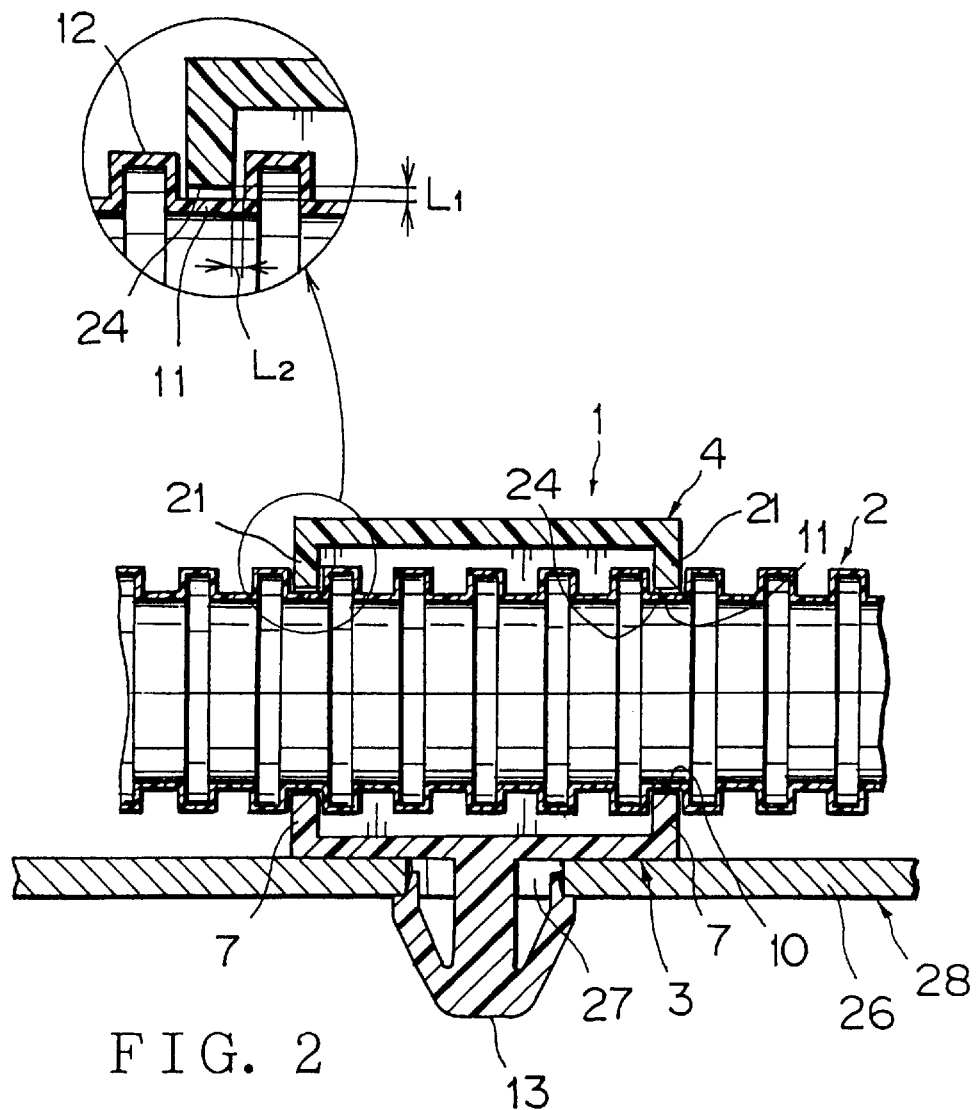
FIG. 2 is a sectional view taken in line A—A in FIG. 1.

FIG. 1 is an exploded perspective view of a first embodiment of a fixing structure and fixing tool for a corrugated tube according to this invention, and FIG. 2 is a sectional view taken in line A—A in FIG. 1.

The fixing structure for a corrugated tube is characterized in that a corrugated tube which is circular in section is held rotatabily in a circumferential direction and immobily in a longitudinal direction in a fixing tool therefore which can be divided into an upper part and a lower part.

As shown in FIG. 1, a fixin tool 1 for fixing a corrugated tube (hereinafter simply referred to a fixing tool) is made of synthetic resin and composed of a lower receiving part 3 and an upper covering part 4. The receiving part 3 is a peripheral wall 5 of a square frame and a bottom wall 6 that is orthogonal to the peripheral all 5. The peripheral wall 5 is composed of front and rear walls 7, 7' opposite to each other and left and right walls 8, 8' opposite to each other. The front and rear walls 7, 7' have semi-circular concave portions 9 recessed for supporting the circular corrugated tube 2 rotatably in the circumferential direction and slidable-contact supporting portions 10 formed on the periphery of the concave portion 9 which serve as guiding portions which are to be engaged with the concave grooves 11 of the corrugated tube 2 with a gap there between.

The pitch of the sliding supporting portions 10, i.e. the interval between the front and rear walls 7, 7' is set for the multiple (once, twice, three times, . . . ) of the pitch of the concave grooves 11 of the corrugated tube 2. The concave grooves 11 and the convex strips 12 are alternately arranged at equal pitches in parallel in a longitudinal direction. The slidable-contact supporting portion 10, i.e. that of each of the front and rear walls 7, 7' are set at a thickness slightly smaller than the widths of the concave groove 11 of the corrugated tube 2. The concave portion 9 is set at radius slightly larger than ½ of the outside diameter, i.e. radius thereof.

The inside of the receiving part 3 constitutes a square space which accommodates the lower part of the corrugated tube 2. The inside of the receiving part 3 may be formed in a semi-circular groove along the outer periphery of the corrugated tube 2. In this case, the slidable-contact supporting portion 10 is protruded as a flange. The sliding supporting portion 10 is not necessarily required to be integral in a semicircular shape.

An engagement clip 13 to be engaged with the hole (not shown) on the mounting side of the vehicle body integrally protrudes from the bottom wall 6 of the receiving part 3. The engagement clip 13 is composed of a supporting bar 14 which protrudes from a bottom wall 6 and a pair of flexible engagement pieces 15 inclined-upward at the tip of the pole 14. The engagement clip 13 rotatably engaged with the hole of the vehicle body can rotate the fixing tool 1 according to the flexing of the wire harness, thereby absorbing bending stress. Incidentally, in place of provision of the clamping clip 13, the bolt passing through the hole of a bracket (not shown) extended from the bottom wall 6 may be anchored to the mounting side of the vehicle body.

The left and right walls 8 of the receiving part 3 is provided with the engagement protrusion 16 against the covering portion. The engagement protrusion 16 has an upward inclined face 16*a* corresponding to the engagement frame piece 17 of the covering part 4 and downward locking face 16*b*. The locking protrusion 16 and the engagement frame piece 17 may be turned upside down. The locking protrusion 16 and engagement frame piece 17 constitutes a locking means.

Like the receiving part 3, the covering part 4 is composed of a peripheral wall 19 of a square frame and an upper wall 20 that is orthogonal to the peripheral wall 19. The peripheral wall 19 is composed of front and rear walls 21 opposite to each other and left and right walls 22 opposite to each other. The front and rear walls 21 each has a semi-circular concave portion 23 rotatably engaged with the concave groove 11 of the corrugated tube 2. The peripheral edge of the concave portion 23 is the slidable-contact supporting portion 24 which is a guiding portion for the concave groove 11.

The pitch of the slidable-contact supporting portions 24, i.e. the interval between the front and rear walls 21 is set for the multiple (once, twice, three times, . . . ) of the pitch of the concave grooves 11 of the corrugated tube 2. The thickness of the slidable-contact supporting portion 24, i.e. that of each of the front and rear walls 21 is set at a thickness slightly smaller than the width S of the concave groove 11 of the corrugated tube 2. The radius of the concave portion 9 is set at a radius slightly larger than ½ of the outside diameter of the, i.e. radius thereof. The concave portion 23 of the covering part 4 has a diameter equal to the concave portion 9 of the receiving portion 3. The slidable-contact portion 24 of the covering part 4 is opposite to the slidable-contact portion 10 of the receiving part 3 over the same thickness.

The inside of the covering part 4 constitutes a square space which accommodates the lower part of the corrugated tube 2. The inside of the covering part 4 may be formed in a semi-circular groove along the outer periphery of the corrugated tube 2. In this case, the sliding supporting portion 10 is protruded as a flange.

The above flexible engagement frame pieces 17 dangle from the left and right walls 22 of the covering part 4, and have engagement holes 25 corresponding to the engagement protrusions 16, respectively. Incidentally, the wall of the left or right wall 22 of the covering part 4 may be integrally coupled with the left or right wall 8 of the receiving part 3 through a thin hinge (not shown) so that the covering part 4 is rotatable in a closing direction.

With the corrugated tube 2 passing through the respective concave portions 9 and 23 of the receiving part 3 and covering part 4, the receiving part 3 and covering part 4 are united in a circle to provide a single ring-shaped slidable-contact supporting portion.

As seen from FIG. 2, the lower part of the corrugated tube 2 is rotatably supported by the receiving part 3, whereas the upper part of the corrugated tube 2 is rotatably supported by the covering part 3. The front wall 7 of the receiving part 3 and the front wall 21 of the covering part 4 are vertically flush with each other. The concave portions 9 and 23 (FIG. 1) of the front walls 7 and 21 are vertically opposite to each other so that the slidable-contact supporting portions 10 and 24 are engaged with the upper and lower portions of the concave grooves 11 of the corrugated tube 2. The concave portions 9 and 23 (FIG. 1) of the rear walls 7 and 21 are vertically opposite to each other so that the slidable-contact supporting portions 10 and 24 are engaged with the upper and lower portions of the concave grooves 11 of the corrugated tube 2. The front and rear slidable-contact portions 10 and 24 are engaged with the concave grooves 11 of the corrugated tube 2 in the longitudinal direction. Thus, the corrugated tube 2 is stably held immobilly in the longitudinal direction and rotatable in the in the circumferential direction.

As seen from an enlarged view within a circle of FIG. 2, a slight gap L1 is formed between the bottom of the concave groove 11 of the corrugated tube 2 and the tip of each of the slidable-contact portions 10 and 24 which are edges of the concave grooves 9 and 23 of the receiving part 3 and the covering part 4. Another slight gap L2 is formed between the side of the concave groove 11 and that of the slidable-contact supporting portion 10, 24. Thus, the corrugated tube 2 can be made smoothly rotatable in the circumferential direction in the fixing tool 1.

Since the corrugated tube 2 is held rotatably in the circumferential direction by the fixing tool 1, where the clamping clip 13 of the fixing tool 1 is secured to the hole 27 of the panel 26 on the mounting side 28 of the vehicle body so that the fixing tool is fixed, even when strong force of in a twisting direction is acted on the corrugated tube 2, the corrugated tube 2 rotates circumferentially to absorb the twisting force. The deformation of the corrugated tube or opening of the slit for ushering the wire harness do not occur. This prevents the corrugated tube 2 from being damaged and the electric wires (not shown) from rushing out and being damaged.

As explained as regards the prior art, the twisting of the corrugated tube 2 occurs when it is fixed on the panel in the two-dimensional or three-dimensional curved shape on the mounting side 28 of the vehicle body. However, in accordance with this invention, the twisting of the corrugated tube 2 is absorbed so that the corrugated tube 2 can be fixed on the panel 26 in the curved shape easily and with good workability.

After the fixing tool 1 is fit over the corrugated tube 2, it is secured to the panel 26 of the vehicle body. Otherwise, after the receiving part 3 is secured to the panel 26 of the vehicle body, the corrugated tube 2 is engaged with the receiving part 3 and then the covering part 4 is united with the receiving part 3.

It should be noted that a plurality of electric wires (not shown) have been ushered into the inside space of the corrugated tube 2. The plurality of electric wires and corrugated tube 2 constitute the wire harness.

The electric wires can be easily inserted into the corrugated tube 2 from the slit in the longitudinal direction. Where the corrugated tube has no slit, the electric wires can be inserted into the corrugated tube 2 from its front or rear circular opening. With the corrugated tube with no slit, it can be rotated more smoothly within the fixing tool 1 since there is no catching when rotated in the circumferential direction.

Even with the corrugated tube 2 having the slit, a vinyl tape is wound over the outer periphery of the corrugated tube 2 at the front and rear of the fixing tool 1 so that the slit is closed. In this case, the concave portion 11 of the corrugated tube 2 can be brought into slidable contact with each of the slidable-contact supporting portions 10, 24 of the covering part 4 and the receiving part 3.

Incidentally, the shape of the receiving part 3 and the covering part 4 should not be limited to the square frame, but may be arc-shaped frame along the outer periphery of the corrugated tube 2. In this case, the inner space of the receiving part 3 and the covering part is reduced so that the fixing tool 1 is downsized. The covering part 4 can be detached from the receiving part 3 through a hinge (not shown).

The receiving part 3 and covering part 4 are arranged vertically on the panel 26 in the horizontal direction, whereas they are arranged horizontally on the panel 26 in the vertical direction. Incidentally, in the specification, the definition of "vertical" and "horizontal" is made for convenience of explanation. Therefore, according to an embodiment, the vertical direction may be reversed so that the receiving part 3 is located at the upper side and the covering part 4 is located at the lower side.

Embodiment 2

Figure 3:
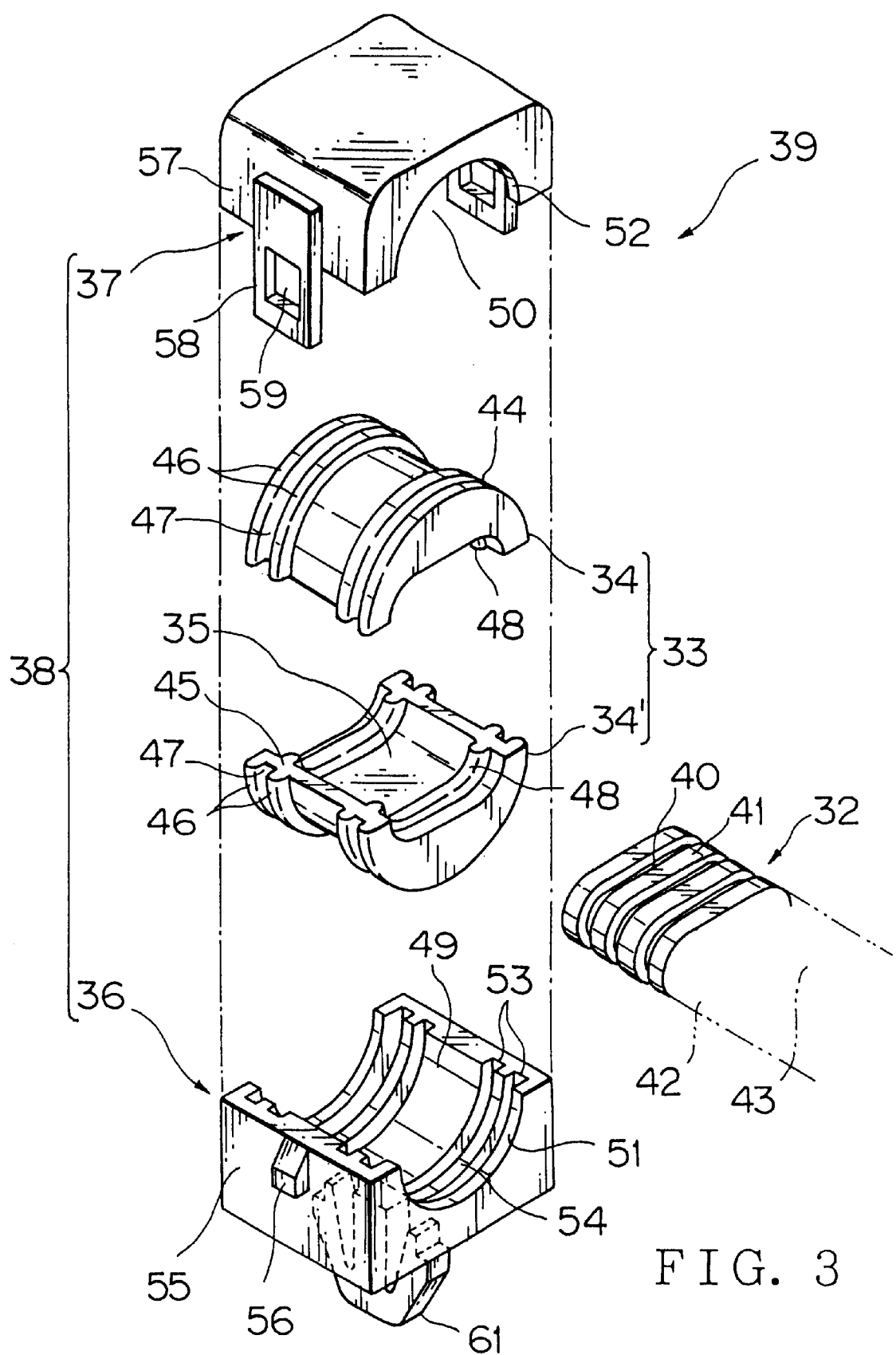
FIG. 3 is an exploded perspective view of a second embodiment of a fixing structure and fixing tool for a corrugated tube according to this invention.

FIG. 3 shows a second embodiment of the fixing structure and fixing tool of a corrugated tube according to this invention.

The feature of the fixing structure for the corrugated tube according to this embodiment resides in that a flat corrugated tube 32 which is oval in section is fixed on the inner wall 35 of a rotating member 33, and the rotating member 33 is held rotatablly in the circumferential direction and immobile in the longitudinal direction by a fixing tool body 38 composed of a receiving part 36 and a covering part 37.

The flat corrugated tube 32 is similar to the corrugated tube 2 in their material and depth and pitch of the concave grooves 40 and convex strips 41. The flat corrugated tube 32 is made flat so that the wire harness is arranged in a small gap or space of the vehicle body. The flat corrugated tube 32 has long diameter portions 42 and short diameter portions 43 in directions orthogonal to each other.

The fixing tool for the corrugated tube (hereinafter simply referred to as a fixing tool) 39 includes a lower receiving part 36, an upper covering part 37 and a rotating member 33 which is rotatably mounted between the receiving part, 36 and the upper covering part, 37 while holding the flat corrugated tube 32. This embodiment is different from the first embodiment in using the rotating member 33. The receiving part 36 and the covering part 37 constitute the fixing tool body 38.

The rotating member 33 is composed of an upper and lower semicircular divisional components 34, 34' which constitute a real-circular outer portion 44 and an oval inner portion 35 in their united state. The left and right dividing faces 45 of the divisional components 34 are joined with each other with no gap.

From the outer periphery of each of the divisional members 34, 34' (outer portion 44), a pair of semi-circular convex strips 46 for slidable-contact with the receiving part 36 and the covering part 37 are circumferentially protruded at both front and rear positions of the divisional members 34, 34'. The pair of convex strips 46 lie adjacent to each other through a circumferential groove 47. The upper and lower semi-circular convex strips 46 are aligned, when united, thereby forming a circular convex strip. The front and rear pairs of convex strips 46 are formed with a square shape in section at the same height. The tip of the convex strip 46 is smoothly formed with no edge. A pair of front and rear convex strips may be substituted for the front and rear pairs.

A pair of front and rear convex strips 48 which are to be fixed on the circumferential grooves 40 of the flat corrugated tube 32 are formed on the inner periphery of each divisional member 34. The upper and lower semi-oval convex strips 48 are aligned, when the upper and lower members 34 are united, thereby forming an oval convex strip. The pitch of the front and rear convex strips 48 is equal to that of the concave grooves 40 of the flat corrugated tube 32. Incidentally, the pitch of the concave grooves 40 is uniform.

The inner diameters (long diameter and short diameter) of the oval convex strip when the upper and lower convex strips 48 of the divisional members 34 are united are approximately equal to those (long diameter and short diameter) of the concave groove 40 of the flat corrugated tube 32. The width of each convex strip 48 is set for a width shorter than the width of the concave groove 40. The tip of the convex strip 48 is formed into a smooth C (curved)-shape. Therefore, the flat corrugated tube 32 can be smoothly fixed with no backlash nor catching vertically and horizontally. Where the convex strip 48 is tapered with a hill-shape in section and its tip is curved like a C, the convex strip 48 can be engaged with the concave groove 40 when the corrugated tube is mounted in the rotating member 33.

The receiving part 36 and the covering part 37 have semi-circular housing portions 49 and 50 corresponding to the ring-shaped rotating member 33, and have two pairs of semi-circular flanges 51 and 52 each having a smaller inner diameter than that of each of the housing portions 49 and 50 at the front and rear ends of these arts 36 and 37, respectively. The rotating member 33 can be housed circumferentially rotatable inside these pairs of the flanges 51 and 52.

Slidable contact grooves 53 and slidable-contact convex strips 54 are formed on the inner wall of each of the housing portions 49 and 50. The slidable contact grooves 53 are guide grooves corresponding to the front and rear respective pairs of convex strips 46 of each of the divisional components 34. The slidable-contact convex strips 54 are guide convex strips corresponding to the circumferential grooves 47 between the pair of convex strips 46. The height of each of the slidable contact grooves 53 is made equal to or larger than the depth of each of the slidable contact convex strips 54. The slidable convex strips 54 are required when the rotating member 33 is provided with the front and rear respective pairs of convex strips 46. Where the rotating member 33 is provided with a pair of front and rear convex strips 46 and 47, only a pair of front and rear slidable contact grooves 53 may be formed on the inner periphery of each of the receiving part 36 and covering part 37. The slidable grooves 53 and slidable-contact convex strip 54 on the side of the covering part 37 are not illustrated. Each of the slidable grooves 53 of the receiving part 36 and the covering part 37 are in contact with the convex strip 46 of the rotating member 33 apart from each other with a slight gap so that the rotating member 33 can be smoothly rotated cicumferentially between the receiving part 36 and the covering part 37. The flanges 51, 52 and the slidable-contact convex strips 54 serve as slidable-contact supporting portions for the rotating member 33.

It is not required that the pair of divisional members 34 be clamped together. When the covering part 37 and receiving part 36 are united, the upper and lower housing portions 49, 50 constitute a complete circular housing. The pair of divisional members 34 can be smoothly rotated circumferentially within the circular housing while it holds the flat corrugated tube 32 in its oval inner portion 35. A positioning pin (not shown) and engagement hole can be provided on the dividing face 45 of the divisional member 34.

As in the first embodiment, the receiving part 36 is provided with clamping protrusions 56 on its left and right walls 55. The covering part 37 is provided with flexible engagement frame pieces 58 each having an engagement hole 59 corresponding to the clamping protrusion 56 on its left and right walls 57. The receiving part 36 is provided with a clamping clip 61 to be engaged with the panel on the mounting side of the vehicle body on the bottom wall. The clamping clip 61 may be similar to that in the first embodiment.

A fixing means composed of a bracket and bolt may be used in place of the clamping clip 61. The covering part 37 may be integrally coupled with the receiving part 36 through a thin hinge (not shown).

The fixing tool 39 can be assembled in the following manner. After the flat corrugated tube 32 has been sandwiched between the upper and lower divisional members 34 (in this case, the inner convex strip 48 is engaged with the concave groove 40 of the corrugated tube 32), the rotating member 33 composed of the upper and lower divisional members 34 is set in the lower receiving part so that the covering part 37 is united with the receiving part 36. Thus, the outer peripheral convex strip 46 of the divisional member 34 is engaged with the slidable-contact groove 53 of each of the receiving part 36 and the covering part 37 so that it is slidable circumferentially. Next, the clamping clip 61 of the receiving part 36 is securely inserted into the hole of the vehicle body.

Otherwise, after the clamping clip 61 of the receiving part 36 has been securely inserted into the panel of the vehicle body, the lower divisional member 34 is set in the receiving part 36. The flat corrugated tube 32 is set in the inner portion 35 of the lower divisional member 34. The upper divisional member 34 is set on the corrugated tube 32. Finally, the covering part 37 is united with the receiving part 36.

With no convex strip 46 on the outer periphery of the rotating member 33, the rotating member 33 can be held rotatably circumferentially only by the flanges 51 and 52 at the front and rear ends of the receiving part 36 and the covering part 37. In this case, the receiving part 3 and covering part 4 in the first embodiment (FIG. 1) constitute semi-circular housing grooves 49 and 50 on their inside.

Otherwise, with no flanges 51, 52, the rotating member 33 can be supported by the slidable contact grooves 53 and/or slidable-contact convex strip 54.

Further, the pair of divisional members 34 may be coupled with each other by a hinge (not shown). Otherwise, with the rotating member integrally formed in a ring-shape non-divisionally, a pair of upper and lower slit-like holes may be formed on the peripheral wall of the rotating member and holding plates (not shown) in place of the convex strips 48 may be fit into the holes, respectively. In this case, the tip of the holding plate is engaged with the concave groove 40 of the flat corrugated tube 32 so that the corrugated tube 32 is secured to the inner periphery of the rotating member.

In any way, where the fixing tool 39 is fixed so that the wire harness is arranged on the two-dimensional or three-dimensional curved panel, even when twisting force is acted on the flat corrugated tube 2, the rotating member 33 holding the corrugated tube 32 rotates circumferentially between the receiving part 36 and the covering part 37 to absorb the twisting force. For this reason, undue twisting force or bending force is not acted on the flat corrugated tube 32. Thus, the deformation of the corrugated tube or opening of the slit for ushering the wire harness do not occur. This permits the wire harness to be arranged smoothly.

Incidentally, in place of the flat corrugated tube 32, the corrugated tube 2 that is round in section as illustrated in FIG. 1 maybe used. In this case, the inner wall 35 of the rotating member 33 is made not an oval but a real circle. Thus, since the circular corrugated tube 2 is rotatably supported by the fixing tool 39 through the rotating member 34, sliding abrasion of the corrugated tube 2 on the fixing tool body 39 can be prevented.

Embodiment 3

Figure 5:
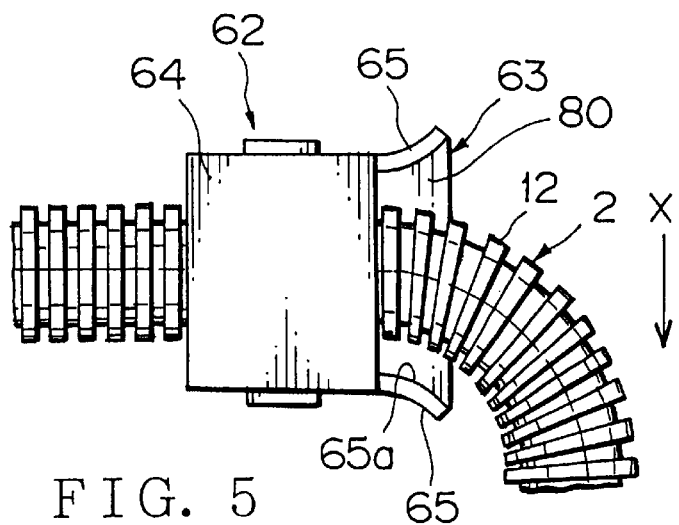
FIG. 5 is a plan view showing the curved state of a wire harness in the third embodiment of this invention.
Figure 4:
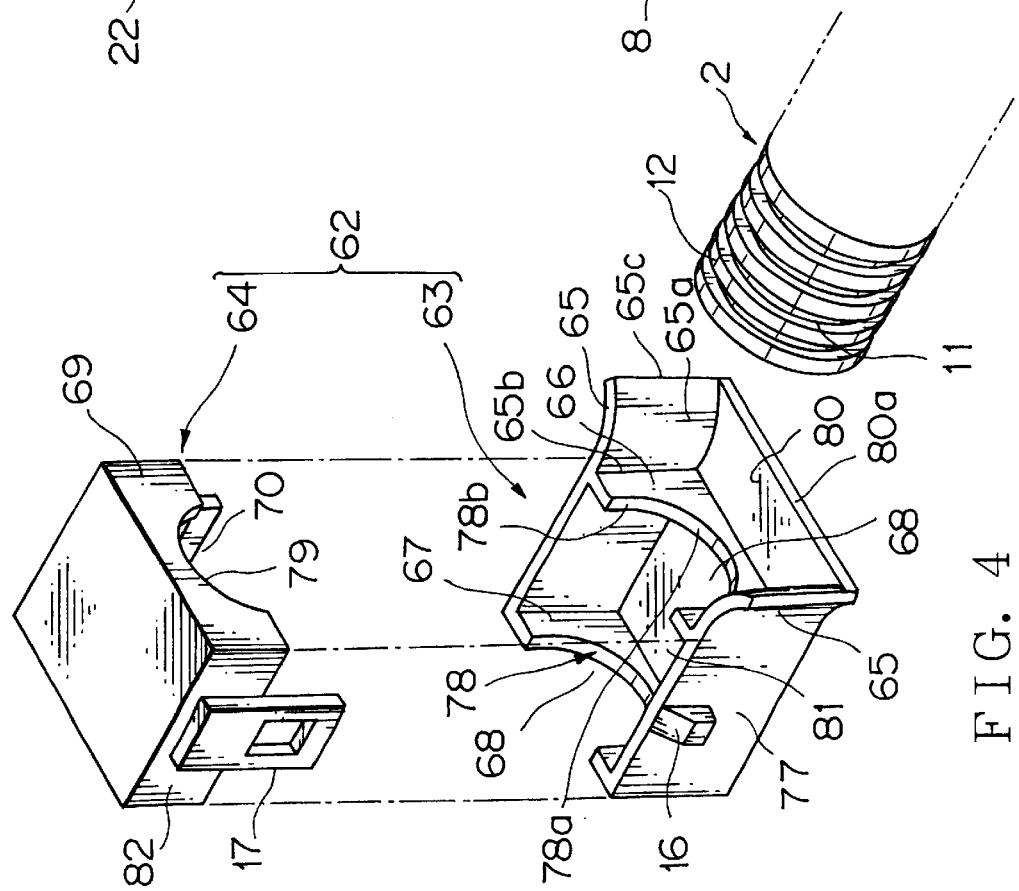
FIG. 4 is an exploded perspective view of a third embodiment of a fixing structure and fixing tool for a corrugated tube according to this invention.

FIGS. 4 and 5 show an third embodiment of a fixing structure and fixing tool for a corrugated tube according to this invention.

The feature of the fixing structure for the corrugated tube according to this embodiment resides in that a corrugated tube 2 that is circular in section is fixed within a fixing tool 62 of synthetic resin composed of a receiving part 63 and covering part 64 as shown in FIG. 4 and outward arced walls 65 are protruded on both left and right sides of the receiving part 63 at the side of deriving the corrugated tube so that the corrugated tube 2 is smoothly flexible along the arced walls 65.

In this embodiment, the receiving part 63 is formed to have a depth slightly greater than that of the receiving part 3 in the embodiment as shown in FIG. 1. The inner periphery of each of the concave portions 68 of the front and rear walls 66 and 67, i.e. slidable-contact supporting portion 78 is composed of a lower arc segment 78a and an upper short vertical straight segment 78b. In this case, the corrugated tube 2 that is circular in section is housed within the concave portion 68 over the height equal or greater than the radius.

The covering part 64 is formed at a height slightly lower than the covering part 4 in the first embodiment. The concave portion 70 at each of the front and rear walls 69 is formed at a depth that is not greater than the radius of the corrugated tube 2. With the covering part 64 closed in the receiving part 63, the corrugated tube 2 is housed in both concave portions 68 and 70 with no vertical and horizontal backlash. The slidable-contact supporting portions 78 and 79 which are formed by the inner peripheries of the concave portions 68 and 70 are engaged with the concave grooves 11 of the corrugated tube 2 so that the corrugated tube 2 are rotatably circumferentially.

The pair of left and right curved walls 65 are formed to protrude from the front wall 66 of the receiving part 63. The thickness of the curved wall 65 is made equal to that of the side wall 77 of the receiving part 63. Therefore, the curved wall 65 can be regarded as the side wall 77 having been extended forward.

The curved wall 65 is curved in an arc outwardly from both ends of the front wall 66. Its curvature of radius is preferably set for a maximum angle of flexing the wire harness, i.e. the corrugated tube 2 in an actual using state. The protruding length of the curved wall 65 is preferably set at a length in which the outer peripheral surface (peripheral surface of a convex strip 12) of the corrugated tube 2 is in contact with the inner face 65a of a curved wall 65 at any position.

The width at both sides of the concave portion 68 of the front wall 66 of the receiving part 63, i.e., the distance between the straight portion 78b of the 33 slidable-contact supporting portion 78 and the base 65b of the curved wall 65 is preferably small. In this case, the outer periphery of the corrugated tube 2 is in contact with the inner face 65a of the curved wall 65 in their larger area. Thus, in FIG. 5, the curve of the corrugated tube 2, i.e. the curve of the wire harness inclusive of the corrugated tube 2 can be smoothly corrected with no bending. Where the side wall 77 of the receiving part 63 is relatively greatly apart from the outer periphery of the corrugated tube 2, the base 65b of the curved wall 65 is should not be formed as an extension of the side wall 77, but preferably arranged at a position near to the slidable-contact supporting portion 78 at the front wall 66.

The lower ends of the pair of left and right curved wall 65 successively crosses a bottom wall extending portion 80 of the receiving part 63. The portion 80 corresponds to a portion extended horizontally forward from the bottom wall 81. The width of the portion 80 is increased in a trumpet-shape toward its front end 80a so as to correspond to the shape of the pair of curved walls 65. The front end 80a of the portion 80 and the front end 65c of the curved wall 65 may be made vertically flush with each other so that the front end 65c of the curved wall 65 supports the corrugated tube 2 with a large bending angle. Thus, the bottom wall 81 and portion 80 can be regarded as constituting an integral bottom wall, and the curved wall 65 can be regarded as a part of the side wall.

As shown in FIG. 5, when the wire harness inclusive of the corrugated tube 2 is swung greatly left or right as indicated as arrow X, the lower end of the corrugated tube 2 is supported stably by the upper face of the corrugated tube 80. Thus, the corrugated tube 2 slides left and right on the extending portion 80 so that it can be guided smoothly and surely. Accordingly, with the aid of the curved wall 65, the wire harness 2 can be flexed in an arc with no bending.

The pair of front and rear slidable-contact supporting portions 78 of the receiving part 63 are arranged with the pitches integer-times as long as the pitches of the concave grooves 11 of the corrugated tube 2. The pair of front and rear slidable-contact supporting portions 79 of the covering part 64 are opposite to the slidable-contact supporting portions 78 of the receiving part 63. The side walls 82 are opposite to the side walls 77 of the receiving part 63. The covering part 64 is clamped to the receiving part 63 by the clamping means 16 and 17. The receiving part 63 is secured to the vehicle body by a clamping clip as shown in FIG. 1 or a bolt (not shown).

In this state, as shown in FIG. 5, even when the wire harness inclusive of the corrugated tube 2 is swung horizontally left or right, the outside of the corrugated tube 2 is brought into contact with the inside of either one of the curved walls 65 and smoothly curved. This prevents the corrugated tube 2 or internal electric wires (not shown) from being bent, and damaged or broken due to its repetitive swing.

The swing of the wire harness occurs also when the corrugated tube is arranged. Further, where the wire harness is arranged from the vehicle body (not shown) to the slide door (not shown) so that the electric appliance on the slide door is supplied with electric power, the wire harness is swung greatly left and right when the slide door is closed/opened. This embodiment is very efficient to suppress the bending of the wire harness due to the swing.

Additionally, in FIG. 4, the pair of left and right curved walls 65 of the receiving part 63 can be extended upright. In this case, when the covering part 64 is closed, the rear end of the curved wall 65 is brought into contact with the front wall 69 of the covering part 64. Since the increased area of the curved wall 65 increases the area to be in contact with the corrugated tube, even when the wire harness is swung upward, the curved wall 65 can accurately catch the corrugated tube 2.

Further, the pair of left and right curved walls may be attached to both side walls 82 and front wall 69 of the covering part 64 in place of the receiving part 63.

In FIG. 4, the extending portion 80 of the receiving part 63 may be curved downward so that the wire harness is curved downward. In this case, the fixing tool is arranged on the step side of the vehicle body so that the wire harness is arranged toward the slide door downward from the step. This prevents the corrugated tube from being damaged, which is attributable to the touching of the lower end of the corrugated tube 2 with the extending portion 80 when the slide door is opened/closed. In addition, the wire harness may be correctively curved downward from the step side so that it is arranged smoothly within the slide door from the lower side of the slide door. Incidentally, where the downward curved wall is provided, the receiving part 63 is secured to the vehicle body so that the downward curved wall does not interfere with the vehicle body.

The pair of curved walls 65 and the downward curved wall may be formed may be integrally formed also at the rear of the receiving part 63 as well as the front thereof. Each curved wall 65 can be formed integrally with the receiving part easily and inexpensively by resin molding. Further, the covering part 64 may be provided with an upward or sidewise curved wall.

Embodiment 4

Figure 6:
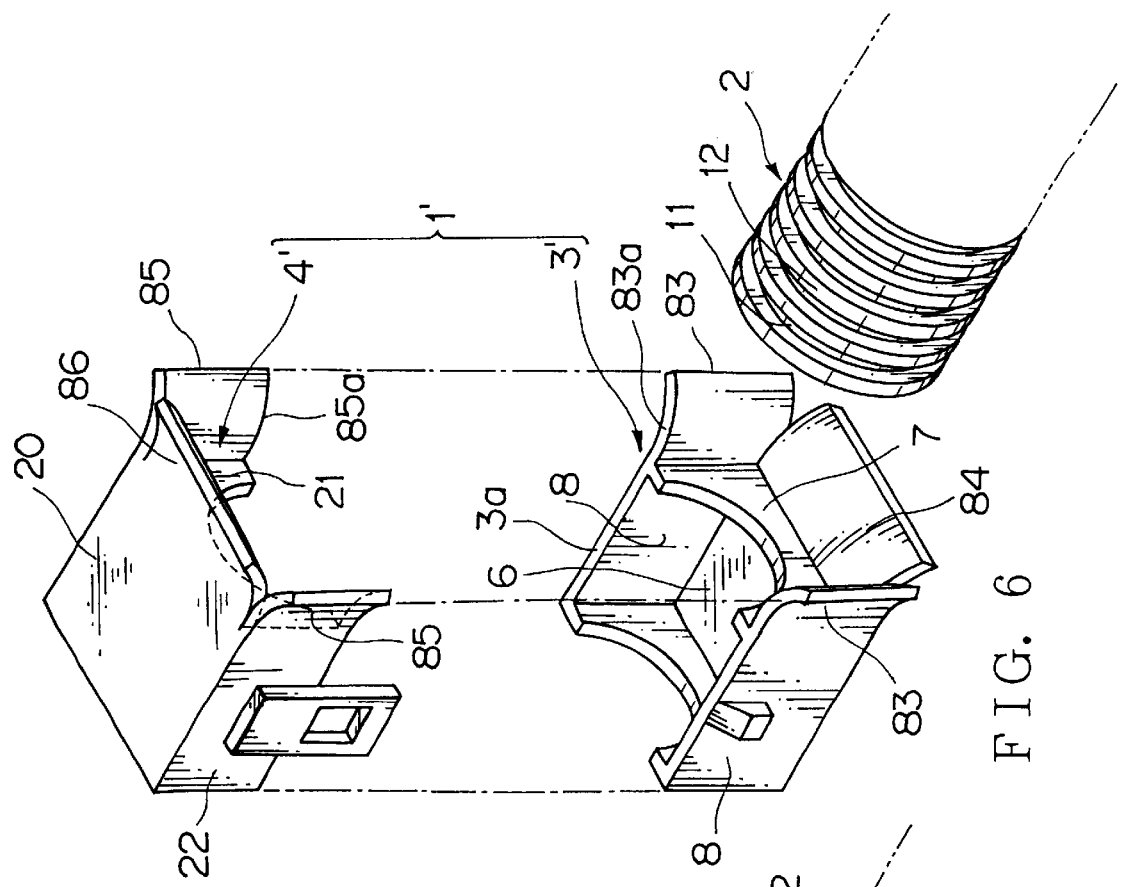
FIG. 6 is an exploded perspective view of a fourth embodiment that is a modification of the third embodiment.

FIG. 6 shows a fourth embodiment of a fixing tool 1' for the corrugated tube composed of a receiving part 3' and covering part 4' consturcted as shown in FIG. 1 which are provided with upward, sidewise and downward curved walls 83–86. In FIG. 6, like reference numerals refer to like elements in FIG. 1.

The receiving part 3' and covering part 4' have approximately equal depths. The center line of the corrugated tube 2 is flush with the upper end 3a of the receiving part 3. Curved walls 83, 84, 85 and 86 are extended to protrude from both side walls of the receiving part 3', the bottom wall 6, both side walls 22 and the upper wall 20. The left and right curved walls 83 and 85 are formed to have equal curvatures of radius, lengths and thicknesses. The upward curved wall 86 of the covering part 4' and the downward curved wall 84 are caused to have different curvatures of radius and lengths, respectively in accordance with the swinging angle of the corrugated tube 2.

In a state where the covering part 4' is closed, the upper ends 83a of the pair of left and right curved walls 83 of the receiving part 3' are joined to the lower ends 85a of the pair of left and right curved walls 85 of the covering part 4' so that joined curved walls each with a large area are formed. Therefore, the left/right swing of the wire harness inclusive of the corrugated tube 2 can be surely caught by these curved walls so that the wire harness can be correctively curved with no bending in a horizontal direction. Likewise, the up/down swing of the wire harness of inclusive of the corrugated tube 2 can be surely caught by the downward curved wall 84 of the receiving part 3' and the upward curved wall 86 of the covering part 4' so that the wire harness can be correctively curved with no bending in a vertical direction.

Like curved walls can be provided at the rear walls as well as at the front walls 7, 21 of the receiving part 3' and/or the covering part 4'. Each of the curved walls 83–86 can be selectively formed at any left/right or upper/lower position.

In the embodiment using the corrugated tube 32 which is oval in section as shown in FIG. 3, the receiving part 36 and/or the covering part 37 may be provided with the curved walls 65, 83–86 as described above. In this case, the longer part 42 of the corrugated tube 32 is corrected in a curved shape in contact with the curved walls 65, 83–86.

Embodiment 5

Figure 8:
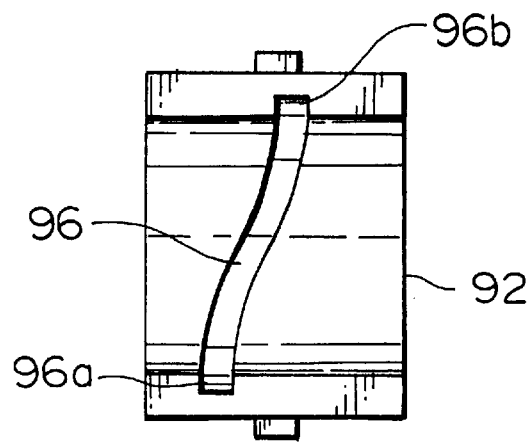
FIG. 8 is a plan view of an example of a cam groove in the fifth embodiment.
Figure 7:
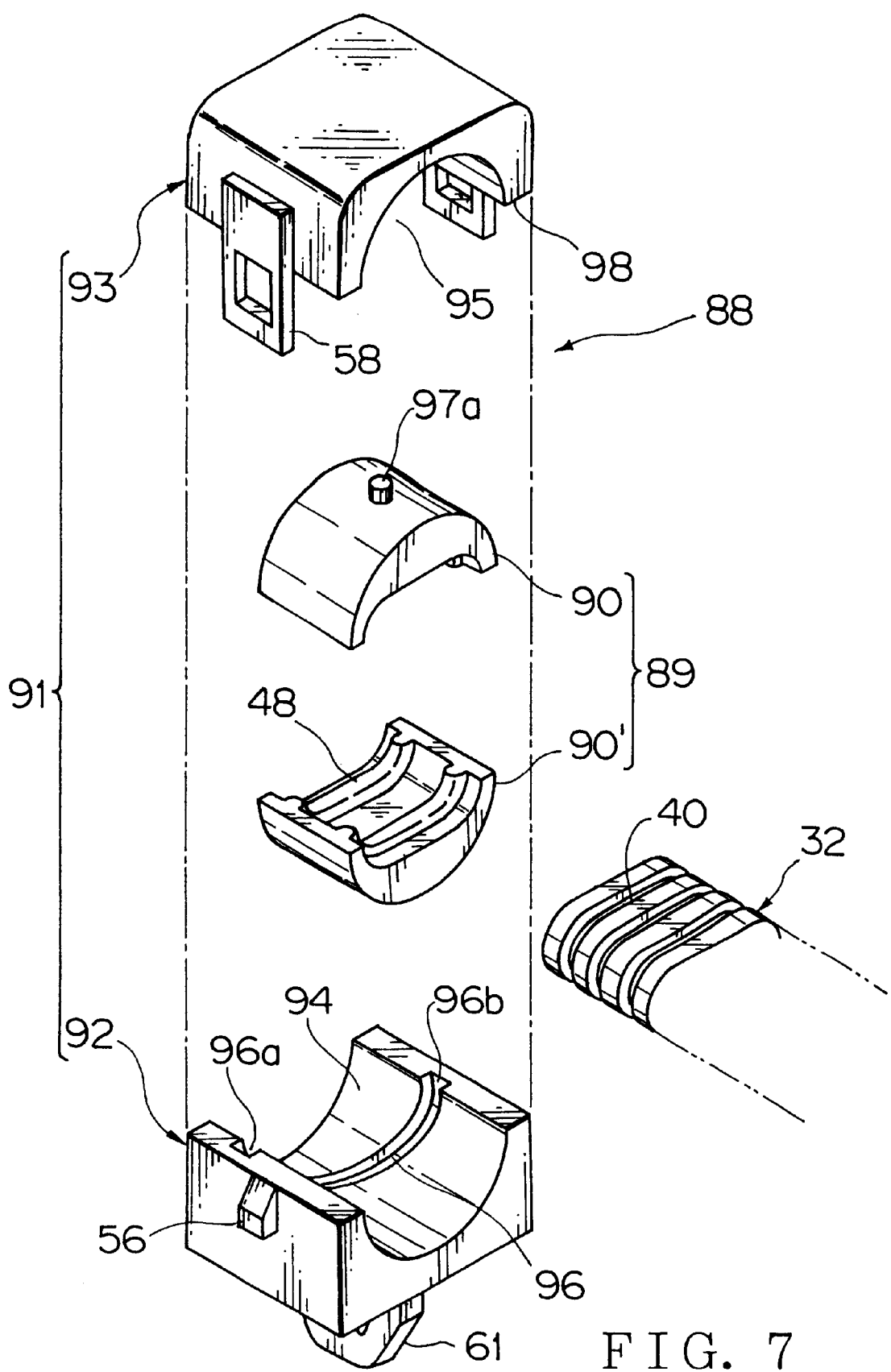
FIG. 7 is an exploded perspective view of a fifth embodiment of a fixing structure and fixing tool for a corrugated tube according to this invention.

FIGS. 7 to 9 show a fifth embodiment of the fixing structure and fixing tool for the corrugated tube according to this invention.

The fixing structure of the corrugated tube is a modification of the second embodiment shown in FIG. 3. The fixing structure according to this embodiment is characterized in that the rotating member 89 within the fixing tool 88 for the corrugated tube is rotated simultaneously with the twisting of the corrugated tube 32 due to the flexing of the wire harness, and the rotating member 89 is made movable in the longitudinal direction of the corrugated tube along the fixing tool body 91 so that pulling of the corrugated tube 32 and the electric wires therein (not shown) is prevented, and the length of deriving the wire harness (corrugated tube 32 and electric wires) from the fixing tool body 91 is changed (or lengthened) so that the flexing radius of the wire harness is increased, thereby preventing the wire harness from being damaged.

Specifically, in the semi-circular housing portions 94 and 95 on the inner periphery of the receiving part 92 and covering part 93, spiral cam grooves 96 are formed (only the cam groove on the side of the receiving part 92 is shown in FIG. 7). A follower projection 97 (for sliding engagement) that corresponds to the cam groove 96 is attached to one of a pair of divisional members 90, 90' (on the outer periphery of the one divisional member 90) which constitute the circular rotating member 89 rotatably held with the housing portions 94 and 95. Thus, the rotating member 89 is made rotatable circumferentially and movable in the longitudinal direction.

The cam groove 96 should be formed to be square in section and in at least one of the receiving part 92 and the covering part 93. In FIG. 7; where the cam grooves 96 are formed in both receiving part 92 and the covering part 93, the one end 96a and the other end 96b of the cam groove 96 of the receiving part 92 (FIG. 8 is a plan view of the receiving part 92 in FIG. 7) are successive to those of the covering part 93. The cam groove of the covering part 93 has a starting point and an ending point with which the follower protrusion 97 can be brought into contact. In this case, the corrugated tube 32 is rotatable over an angle of approximately 360°. The shaped of the cam grooves of the receiving part 92 and covering part 93 may be replaced by each other so that the cam groove of the receiving part 92 is provided with the starting point and the ending point.

Otherwise, the cam groove 96 may be formed in only the receiving part 92 so that the joining face 98 at the lower end of the covering 93 constitute the starting point 96a and ending point 96b, and hence the contact face with the projection 97. In this case, the lower divisional member 90' corresponding to the receiving part 92 is provided with the follower projection 97 so that the corrugated tube 32 is rotatable in the angle range of approximately 180°.

The projection 97 is formed in a short cylinder shape having an outer periphery 97a which is smaller than the inner width of the cam groove 96. The projection 97 is arranged centrally on the outer periphery of the one divisional member 90. The projection 97 is preferably arranged at either one of the divisional members 90 and 90' so that a large rotating angle can be obtained. Where the projections 97 are attached to both the divisional members 90 and 90', they must be arranged so as to correspond to the positions of the cam grooves of the receiving part 92 and covering part 93 and hence to be staggered from each other in a longitudinal direction. This reduces the rotating angle to approximately half.

Figure 9A:
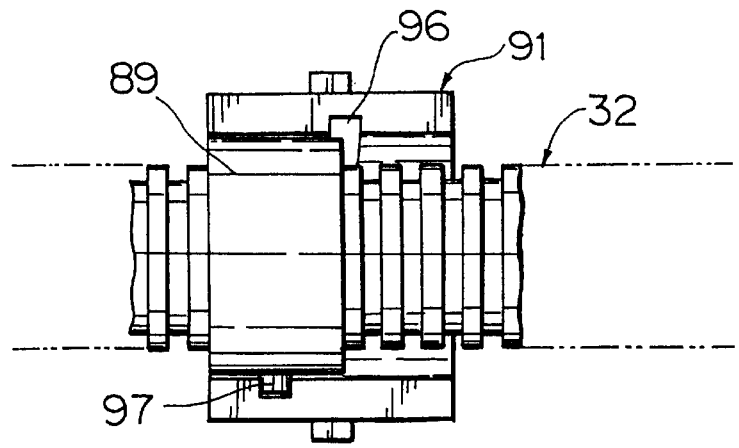
FIGS. 9A and 9B are a plan view of a wire harness when it is twisted in a direction and a plan view of the wire harness when it is twisted in an opposite direction, respectively.
Figure 9B:
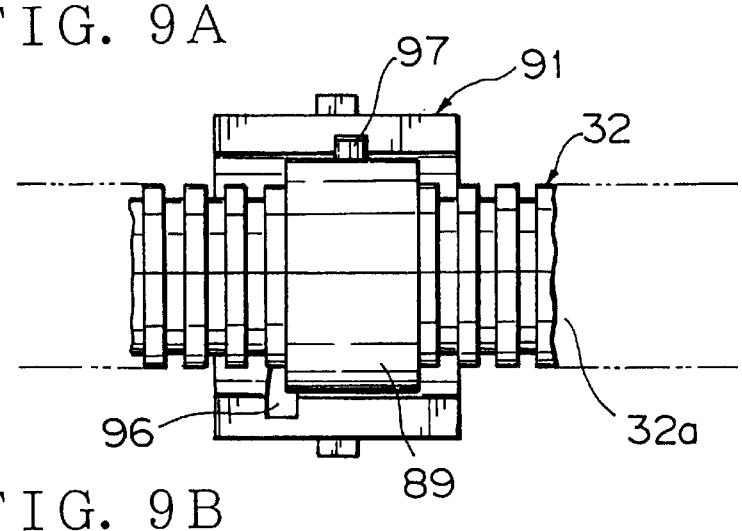
Figure 12:
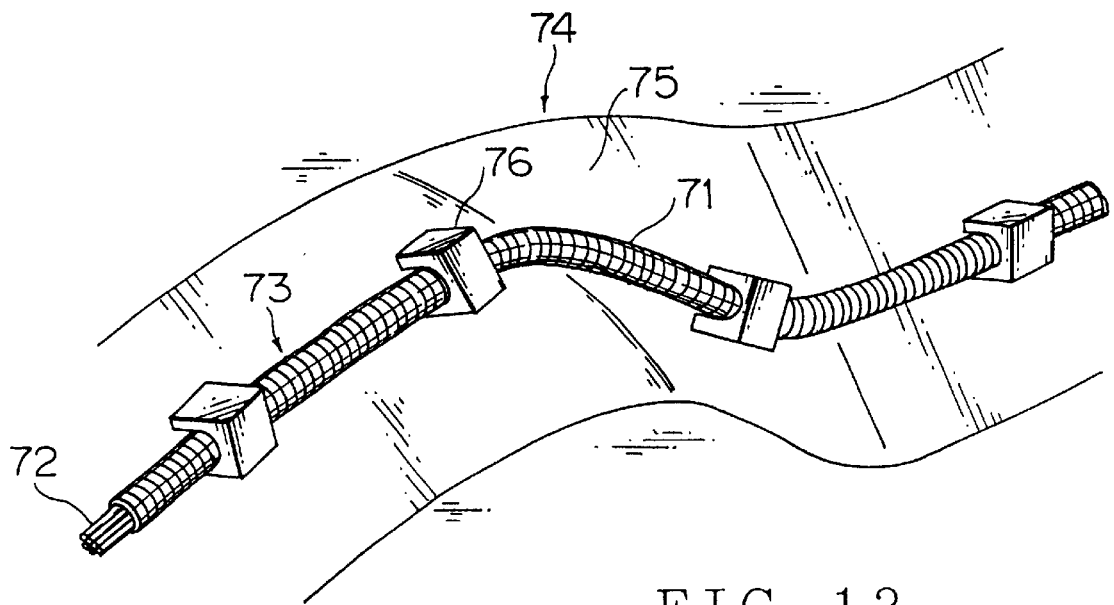
FIG. 12 is a perspective view of a conventional fixing structure for a corrugated tube.

FIGS. 9A and 9B show the state where the corrugated tube 32 rotates over 180°. As seen from these figures, the rotating member 89 moves in the longitudinal direction as the projection 97 of the rotating member 89 slides from the one end of the cam groove 96 to the other end thereof. Thus, the harness component 32a on the right side of the fixing tool body 91 is prolonged so that pulling thereof is suppressed and the flexing radius thereof is increased due to the redundant length. This prevents undue force from being acted on the corrugated tube 32, particularly internal electric wires (not shown) and hence them from being damaged.

For example, where the fixing tool 88 (FIG. 7) is arranged on the side of the vehicle body and the harness component 32a is arranged on the side of the slide door from the vehicle body, FIG. 9A shows the state where the slide door has been fully opened, whereas FIG. 9B shows the state where the slide door has been fully closed. When the slide door is fully opened, the harness component 32a is curved to warp, and when the slide door is fully closed, the harness component 32a is pulled in a direction of closing the slide door. However, the harness component 32a is prolonged toward the slide door while it rotates integrally with the rotating member 89. For this reason, the pulling force is relaxed and the harness component 32a on the right side of the fixing tool body 91 is duly flexed with a great flexing radius. As described above, this prevents the electric wires from being damaged.

In FIG. 7, the configuration other than the elements described above, which is substantially the same as that of FIG. 3, is not explained here. The surface of the respective housing portions 94 and 95 of the receiving part 92 and the covering part 93 and the outer surface of the rotating member 89 are made smooth with no unevenness other than the cam groove and projection 97 so that the rotating member 89 can be rotated smoothly. On the inner surface of the rotating member 89, convex strips 48 corresponding to the concave grooves 40 of the corrugated tube 32 are formed. In FIG. 7, reference numerals 58 denotes an engagement frame piece, 56 a locking projection, and 61 a locking clip.

The rotating member 89 in FIG. 7 has an oval inner peripheral portion corresponding to the flat corrugated tube 32. The rotating member 89 may have a circular inner peripheral portion corresponding to the circular corrugated tube 2 (FIG. 1). In this case, the diameter of the circular inner peripheral portion is set to be equal to or shorter than the outer diameter of the corrugated tube 2 so that the corrugated tube 2 is made immobile circumferentially. In such a configuration, the sliding abrasion of the corrugated tube 2 with the fixing tool 1 can be prevented.

Incidentally, the follower projection 97 may be attached to the fixing tool 91, but not to the rotating member 89, and the cam groove 96 may be formed on the outer surface of the rotating member 89 but not on the fixing tool 91.

Embodiment 6

Figure 10:
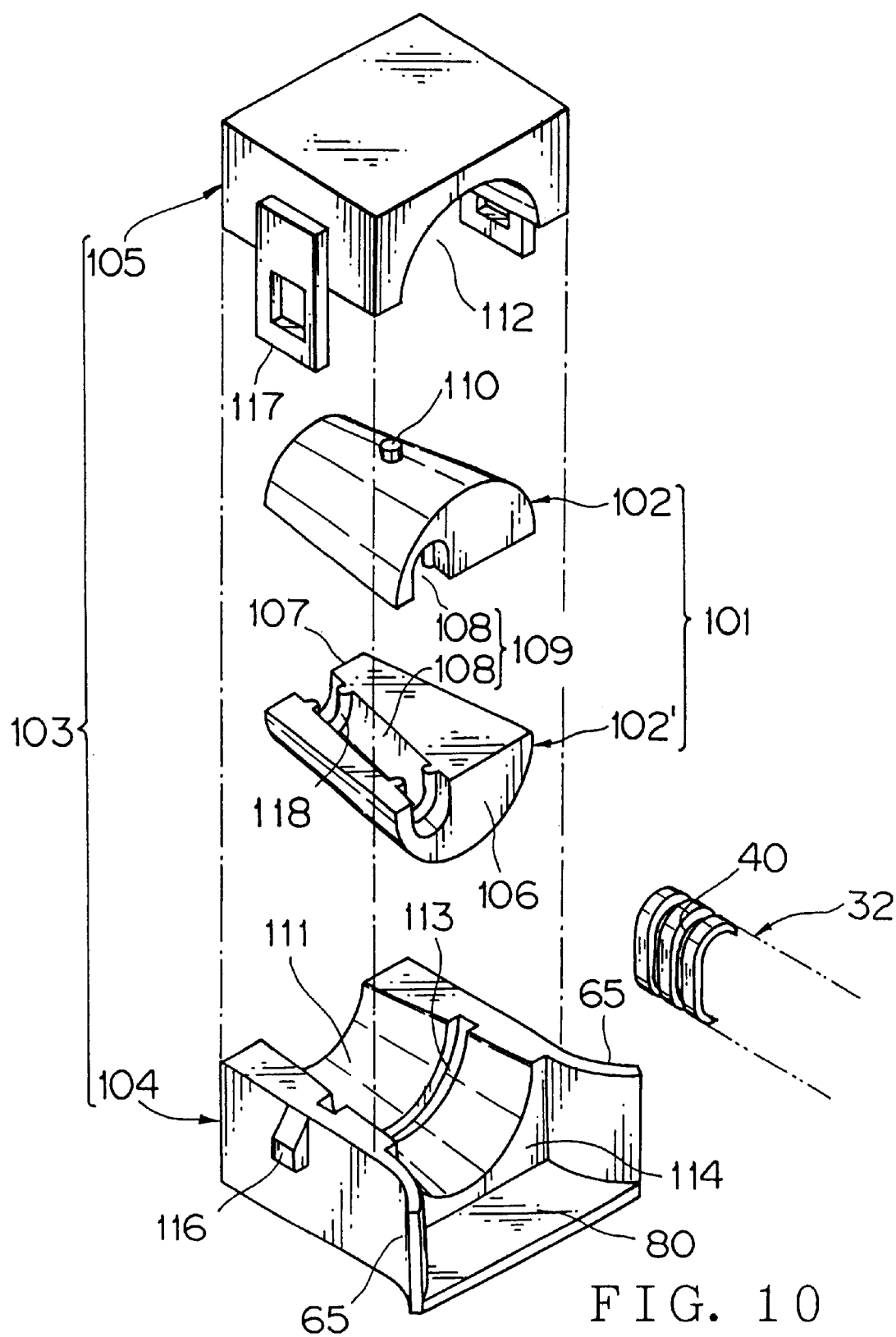
FIG. 10 is an exploded perspective view of a sixth embodiment of a fixing structure and fixing tool for a corrugated tube according to this invention.

FIGS. 10 and 11 show a sixth embodiment of a fixing structure and fixing tool for a corrugated tube according to this invention.

The feature of this embodiment resides in that the corrugated tube 32 is held in a state decentered in an oblique direction by a rotating member 101, and when the rotating member 101 is rotated inside the fixing tool body 103, the harness component 32a (FIG. 11A) derived from the rotating member 101 is flexed with a great flexing radius, thereby preventing the corrugated tube 32 and inner electric wires (not show) from being damaged.

As seen from FIG. 10, the rotating member 101 is composed of a pair of divisional members 102 and 102' which are tapered. The one (front) end face 106 of the rotating member 101 has a larger diameter whereas the other (rear) end face 107 thereof has a smaller diameter. These end faces are formed in a real circular shape. A harness holding groove 108 is straightly formed from the center of the rear end face 107 of each of the divisional members 102, 102' toward the outer periphery of the front end face 106 thereof. The pair of holding grooves 108 thus formed are joined together to constitute an oval harness holding hole 109.

The harness holding groove 108 in this embodiment corresponds to the flat corrugated tube 32 that is oval in section. Where the corrugated tube is circular in section (FIG. 1), the harness holding groove that is semi-circular in section is formed. The harness holding grooves 108 each formed in a oblique direction eccentric from the center axis of the rotating member 110. The harness holding grooves 108 are extended in parallel to the outer face of the divisional members 102, 102'.

A pair of front and rear convex strips 118 to be engaged with the concave grooves 40 of the corrugated tube 32 are formed within each of the harness holding grooves 108. The corrugated tube 32 is held immobily within the harness holding hole 109. Where the corrugated tube 32 is circular, it is preferably held immobily circumferentially within the rotating member.

A short cylindrical projection 110 is formed for positioning/sliding for the fixing body 103 on one or both of the divisional members 102, 102' of the rotating member 101. In the case of the fixing tool shown in FIG. 10, a pair of symmetrical projections 110 are preferably arranged on both divisional members 102, 102' in view of stability of posture.

The fixing tool 103 is composed of a receiving part 104 and a covering part 105. The housing portions 111 and 112 inside the receiving part 104 and covering part 105 are formed as tapered grooves corresponding to the shape of the rotating member 101. The outer diameter of the tapered hole formed when the housing portions 111 and 112 are joined is slightly larger than the outer diameter of the rotating member 101 so that the rotating member 101 is held rotatably circumferentially within the hole. A pair of grooves 113 for guiding which correspond to the projections 110 are formed continuously in a ring-shape on the smooth inner faces of the housing portions 111, 112. The grooves 113 may be formed as the inclined or spiral cam groove 96 as in FIG. 7 so that the rotating member 101 is movable in the longitudinal direction of the corrugated tube 32. In this case, the rotating member 101 is preferably cylindrical but not tapered from the standpoint of suppressing backlash.

On both sides of the front wall 114 of the receiving part 104 of the fixing tool 103, curved walls 65 for guiding the harness, as in the embodiment shown in FIG. 4, are formed to open outwardly. Both curved walls 65 are coupled with each other through the extending portion 80. The base of each of the curved walls 65 is orthogonal to the front wall 114. Both side walls of the receiving part 104 is provided with clamping protrusion 116. Both side walls of the covering part 105 is provided with engagement frame pieces 117.

The flat corrugated tube 32 is held immobily between the pair of divisional member 102, 102' of the rotating member 101. The rotating member 101 is housed rotatably circumferentially between the receiving 104 and the covering part 105. The projections 110 are engaged with the grooves for guiding, respectively. The clamping projections 116 are engaged with the engagement frame pieces 117.

Figure 11A:
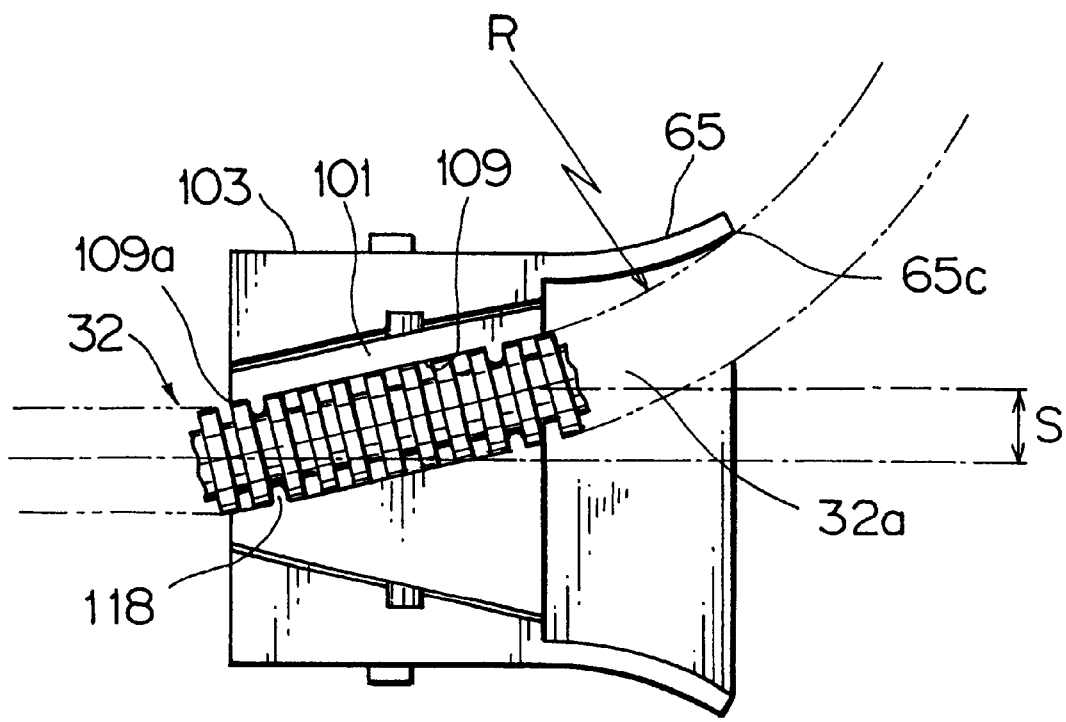
FIGS. 11A and 11B are a plan view of a wire harness when it is flexed in a direction and a plan view of the wire harness when it is flexed in an opposite direction, respectively.

In this state, as seen from FIG. 11A, where twisting force is acted on the wire harness so that the wire harness is flexed rightward, the rotating member 101 rotates. Then, the harness holding hole 109 inclines in a harness flexing direction so that the center of the front side of the harness holding hole 109 is decentered (S) from the center of the rear side toward the harness flexing direction. Thus, the wire harness, i.e. corrugated tube 32 and inner electric wires flexes with an increased flexing radius R. Namely, the wire harness is curved in an arc shape from the rear end 109a of the harness holding hole 109 toward the front end inside 65c of the front curved wall 65.

This is because the rotating member 101 has the harness holding hole 109 decentered in the oblique direction. For example, the rotating member 33 having the inner portion 35 in the axial direction as shown in FIG. 3 flexes from the center of the front end of the rotating member 33 (but not the rear end 109a of the harness holding hole 109) toward the inside of the front end of the curved wall 65 with a small flexing radius. Correspondingly, undue bending force is acted on the wire harness.

Figure 11B:
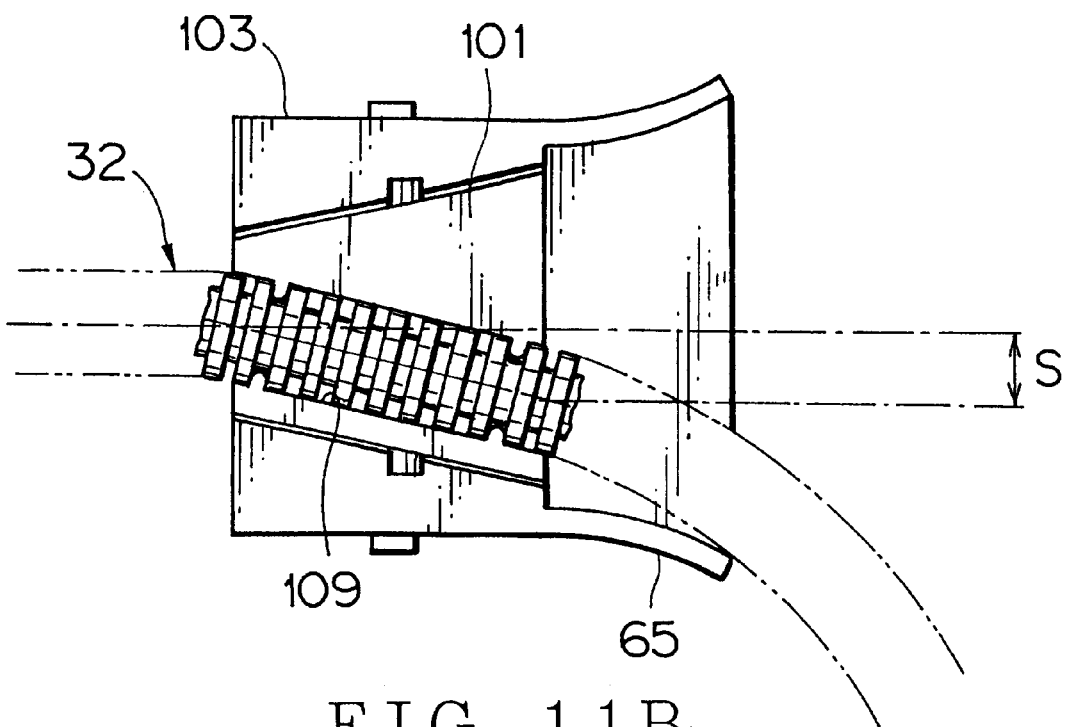

In the fixing tool shown in FIG. 11A, undue bending force is not acted on the wire harness, thereby preventing the corrugated tube 32 and electric wires from being damaged. During flexing, the wire harness is smoothly curved along the front end inside 65c of the curved wall 65. The direction of curving is preferably the direction of the short diameter of the flat corrugated tube 32 in view of flexibility. Particularly, since the rotating member 101 is tapered along the harness holding hole 109, the rotating member 101 rotates smoothly with no catching according to the twisting of the wire harness. Thus the twisting of the wire harness can be absorbed accurately.

Where twisting force in the reverse direction is acted on the wire harness from the state of FIG. 11A, as seen from FIG. 11B, the wire harness is rotated over 180° integrally with the rotating member 101 so that it is curved with an increased flexing radius due to eccentricity S as in the case of FIG. 11A. Thus, the wire harness is smoothly brought into contact with the curved wall 65 on the opposite side, thereby preventing the wire harness from being flexed. Incidentally, even where the curved wall 65 is not provided, the wire harness can be curved with a large flexing radius owing to the harness holding hole 109 decentered in the oblique direction.

FIG. 11A shows the state where the slide door has been fully opened, whereas FIG. 11B shows the state where the slide door has been fully closed. When the slide door is opened, the wire harness is twisted while being pulled in the direction of opening the slide door. When the slide door is closed, the wire harness is twisted while being pulled in the direction of closing the slide door. Thus, while the slide door is opened/closed, the wire harness is rotated circumferentially, and smoothly flexed with a large flexing radius while absorbing the twisting. This prevents the wire harness from being damaged.

Incidentally, as in the embodiment of FIG. 6, the curved walls 84 and 85 can be given on the bottom of the covering part 105 and receiving part 104. The cam groove 96 in FIG. 7 can be also applied to this embodiment. Further, the groove 113 for guiding may be formed on the outer surface of the rotating member 101 and the projection 110 for the slidable contact may be attached to the fixing tool 103. Further, the rotating member 101 may be formed in a cylindrical shape as in FIG. 8, but not tapered and the only harness holding hole 109 may be decentered in the oblique direction. In this case, the housing portions 111, 112 of the fixing tool 103 are caused to have a uniform inner diameter corresponding to that of the rotating member 101.

What is claimed is:

1. A fixing structure for a corrugated tube which is fixed on a mounting side of a vehicle body by a fixing tool, said corrugated tube being circular in section and having circumferential concave grooves an convex strips arranged alternately in the longitudinal direction of said corrugated tube, said corrugated tube and a plurality of electric wires passing through said corrugated tube constituting a wire harness, wherein said fixing tool includes a rotating member having a circular outer periphery for said corrugated tube in its inside, and rotating member is held rotatably in a circumferential direction within a body of said fixing tool.

2. A fixing structure for a corrugated tube according to claim 1, wherein a cam groove is formed in one of said body of the fixing tool and the rotating member and a projection which moves along said cam groove is attached to the other thereof so that said rotating member can move in the longitudinal direction of the wire harness while it rotates.

3. A fixing structure for a corrugated tube according to claim 1, wherein said rotating member has an inside portion for immobily holding said corrugated tube, and said inside portion is decentered in an oblique direction so that said wire harness is flexible with a large flexing diameter in the oblique direction.

4. A fixing structure for a corrugated tube according to claim 3, wherein said body of the fixing tool is provided with curved walls for said wire harness on a decentered side of said inside portion.

5. A fixing structure for a corrugated tube according to claim 3, wherein said corrugate tube is oval in section.

6. A fixing tool for fixing extending a corrugated tube to a mounting side of a vehicle body, said corrugated tube being circular in section and having circumferential concave grooves and convex strips arranged alternately in the longitudinal direction, wherein said fixing tool includes a receiving part and a covering part for holding rotatably said corrugated tube in its circumferential direction, wherein said receiving part and said covering part have slidable contact, wherein said fixing tool further comprises a rotating member for fixing inside said corrugated tube which is oval in section, and said rotating member is held rotatably in a circumferential direction by said receiving part and said covering part.

7. A fixing structure for a corrugated tube according to claim 6, wherein said receiving part or covering part is provided with outward curved walls with which an outer surface of said corrugated tube is to be brought into contact so that the corrugated tube is prevented from becoming buckled.

8. A fixing structure for a corrugated tube according to claim 7, wherein said curved walls are provided oppositely in a horizontal or vertical direction on the side of deriving said corrugated tube.

9. A fixing tool for a corrugated tube to a mounting side of a vehicle body, said corrugated tube being circular or oval in section and having circumferential concave grooves and convex strips arrange alternately in a longitudinal direction of the corrugated tube, wherein said fixing tool includes a rotating member for fixing a corrugated tube in said fixing tool and a receiving part and a covering part for rotatably holding said rotating member in a circumferential direction.

10. A fixing tool for a corrugated tube according to claim 9, wherein said rotating member is divided into divisional members each having an inside portion which is circular or oval in section corresponding to a shape of said corrugated tube, and said inside portion has a convex strip to be engaged with one of said concave grooves of said corrugated tube.

11. A fixing structure for a corrugated tube according to claim 10, wherein a cam groove is formed in one of said rotating member, said receiving part and said covering part, and a follower projection which moves along said cam is formed in the other thereof.

12. A fixing structure for a corrugated tube according to claim 11, wherein said cam groove has a starting point and an ending point with which said follower projection can be brought into contact.

13. A fixing tool for a corrugated tube according to claim 10, wherein said receiving part and covering part and said divisional members are rotatably coupled with each other using a hinge.

14. A fixing tool for a corrugated tube according to claim 9, wherein said rotating member has a convex strip and/or circumferential groove on its outer periphery and said receiving part and said covering part have a slidable-contact groove and/or slidable-contact convex strip which are to be slidably engaged with said convex strip and said circumferential groove.

15. A fixing structure for a corrugate tube according to claim 9, wherein said rotating member and inside portions of said receiving part and said covering part are tapered, and the inside of said rotating member is decentered in an oblique direction.

* * * * *